(12) United States Patent
Ishikawa et al.

(10) Patent No.: US 7,201,073 B2
(45) Date of Patent: Apr. 10, 2007

(54) ANGLE ADJUSTING DEVICE

(75) Inventors: Hirokazu Ishikawa, Tokyo (JP); Yoichi Nakazato, Tokyo (JP)

(73) Assignees: Beldex Corporation, Tokyo (JP); THK Co., Ltd., Tokyo (JP)

( * ) Notice: Subject to any disclaimer, the term of this patent is extended or adjusted under 35 U.S.C. 154(b) by 352 days.

(21) Appl. No.: 10/377,668

(22) Filed: Mar. 4, 2003

(65) Prior Publication Data

US 2003/0167865 A1    Sep. 11, 2003

(30) Foreign Application Priority Data

Mar. 6, 2002  (JP) ............................ P2002-060192
Oct. 15, 2002 (JP) ............................ P2002-300036

(51) Int. Cl.
*F16C 29/00*   (2006.01)

(52) U.S. Cl. ......................... 74/89.23; 384/45

(58) Field of Classification Search ............... 74/89.31, 74/89.32, 89.33, 89.34, 89.15, 566, 441, 74/424.8, 25, 29, 30, 89.23; 384/45, 43, 384/55; 108/20, 143
See application file for complete search history.

(56) References Cited

U.S. PATENT DOCUMENTS

| | | | | |
|---|---|---|---|---|
| 2,330,154 A | * | 9/1943 | Stabinski ...................... | 384/55 |
| 2,871,768 A | * | 2/1959 | Froberg, Jr. .................. | 269/59 |
| 3,273,879 A | * | 9/1966 | Floren .......................... | 269/61 |
| 4,462,579 A | * | 7/1984 | Satake .......................... | 269/61 |
| 4,666,219 A | * | 5/1987 | Higuchi et al. ............... | 312/7.2 |
| 4,947,763 A | * | 8/1990 | Piorek ........................... | 108/8 |
| 5,074,221 A | * | 12/1991 | Lochridge ..................... | 108/6 |
| 5,172,982 A | * | 12/1992 | Komiya ........................ | 384/45 |
| 5,233,792 A | * | 8/1993 | Suzuki ........................ | 451/160 |
| 5,957,586 A | * | 9/1999 | Okamoto et al. ............. | 384/45 |
| 5,988,075 A | * | 11/1999 | Arai et al. ..................... | 108/20 |
| 6,102,353 A | * | 8/2000 | Dichter ........................ | 248/371 |
| 6,210,039 B1 | * | 4/2001 | Teramachi ................... | 384/45 |
| 6,547,437 B2 | * | 4/2003 | Kamimura et al. ........... | 384/45 |
| 6,622,360 B2 | * | 9/2003 | Ohsawa ......................... | 29/42 |

FOREIGN PATENT DOCUMENTS

| | | | |
|---|---|---|---|
| JP | 63-102846 | * | 5/1988 |
| JP | 9-300229 | * | 11/1997 |
| JP | 2000-230548 | | 8/2000 |
| JP | 2001-99150 | | 4/2001 |

* cited by examiner

*Primary Examiner*—William C. Joyce
(74) *Attorney, Agent, or Firm*—Westerman, Hattori, Daniels & Adrian, LLP.

(57) ABSTRACT

An angle adjusting device includes a pedestal, a pair of guide members having an arcuate track, an oscillation body moved along the track of the guide members, and a moving member for moving the oscillation body to adjust the angular position of the oscillation body around an oscillation axis. The moving member has a motor provided in the pedestal, a linkage shaft provided in the oscillation body, and a linkage mechanism interposed between the motor and the linkage shaft. A principal linkage member of the linkage mechanism is linked to a top end portion of an output shaft rotatably around an axis parallel to the oscillation axis, and linked to the linkage shaft to be linearly movable in its axial direction. The guide members have two flat reference planes, and fixed in a state where those reference planes are contact with two flat setting planes of the pedestal.

4 Claims, 8 Drawing Sheets

US 7,201,073 B2

ANGLE ADJUSTING DEVICE

BACKGROUND OF THE INVENTION

1. Field of the Invention

The present invention relates to an angle adjusting device so-called a gonio-stage or swivel-stage.

2. Description of the Related Art

One of the prior art documents regarding the angle adjusting device of the invention is JP-A-2000-230548 (FIG. 1, FIG. 10). This publication discloses a biaxial angle adjusting device. In a first embodiment of this device, a lower stage structure and an upper stage structure are substantially the same. In each stage, the device has a pedestal, U-shaped in cross section, having a bottom wall and both side walls. The upper edge of both side walls for this pedestal is formed like a circular arc, and a guide member having an arcuate shape is fixed on a vertical flat outer face (setting plane) along the upper edge thereof. This guide member is fixed to the side wall by a screw from the outside. An arcuate groove (track) is formed on the upper and lower faces of the guide member.

Moreover, the device comprises an oscillation body in each stage. This oscillation body comprises an oscillation table having an upper wall and both side walls, and U-shaped in cross section, and a transit block fixed to an inner face of both side walls for this oscillation table. Each transit block has an endless circulation passage, and balls are arranged in this endless circulation passage. A part of this endless circulation passage faces a track of the guide member, and the balls located between them roll while moving along the track of the transit block.

The device further has moving means. This moving means moves the oscillation body along the arcuate track to adjust the angular position of the oscillation body around an oscillation axis (axis passing through the center of radius of curvature for the track). This moving means comprises a motor provided in the oscillation table and an arcuate rack meshing with a pinion in the first embodiment of the above publication, as shown in FIG. 1. This rack is fixed near the upper edge of the inner face of both side walls for the pedestal. Along with the rotation of the motor, the oscillation body is moved along the track via the engagement of the pinion and the rack.

In a fourth embodiment of the publication as shown in FIG. 10, the moving means in the lower stage is different from that of the first embodiment. The moving means in the lower stage comprises a motor provided in the pedestal, a ball screw mechanism linked with this motor, a first movement body that is linearly moved horizontally by the ball screw mechanism, and a second movement body slidably provided vertically on this first movement body. The oscillation table is rotatably linked to the second movement body. In this embodiment, the first movement body is moved horizontally via the ball screw mechanism along with the rotation of the motor, in which this horizontal movement is converted via the second movement body into the movement of the oscillation table along the track.

A device of JP-A-2001-99150 (FIG. 2, FIG. 4), like the above publication, comprises a pedestal, one pair of arcuate guide members fixed to this pedestal, an oscillation body being moved along the track of the guide members, and moving means for moving the oscillation body to adjust the angular position of the oscillation body around an oscillation axis (axis passing through the center of radius of curvature for the arcuate track). A convex portion is formed in the center of the pedestal, and serves as a first setting plane where both side faces of this convex portion are vertical. Also, an upper face adjacent to the convex portion is an arcuate face, serving as a second setting plane. By the way, one side face of the guide member is a first reference plane, flat, and an arcuate groove serving as the track is formed on the other side face. Moreover, a lower face of the guide member is a second reference plane serving as an arcuate face. The guide member is fixed to the pedestal by screw toward the second setting plane in a state where the flat first reference plane of the guide member is in contact with the first setting plane for the pedestal and the second reference plane of arcuate face is in contact with the second setting plane.

The moving means of the device of JP-A-2001-99150 comprises a motor provided in the pedestal, a worm that is rotated by this motor, and a gear portion formed on the oscillation body and meshing with the worm. Along with the rotation of the motor, the oscillation body is rotated via the engagement of the worm and the gear portion.

In recent years, there is a demand for making the fine angular adjustment at high precision. However, with the conventional angle adjusting device comprising the device of the above publication, this demand was not met with. The reason will be detailed below.

In the device of JP-A-2000-230548, since the guide member is fixed by screws in a state where the arcuate flat reference plane is in contact with the flat setting plane of the pedestal, the arcuate guide member is distorted at the time of tightening the screw, so that the roundness of the track for the guide member is degraded. Also, in the device of JP-A-2001-99150, since the second reference plane of the guide member is aligned with the circular face of the second setting plane in the pedestal, if the roundness of the circular arc of the second setting plane is low, or the second setting plane and the second reference plane have slightly different radius of curvature for the circular arc, the guide member is distorted and the roundness of the track for the guide member is degraded, so that the precision of the angular position adjustment is degraded.

In the first embodiment of JP-A-2000-230548, the rack and the pinion are provided in each of the oscillation body and the pedestal. In the fourth embodiment, the customized ball screw mechanism is built into the pedestal. Also, in the device of JP-A-2001-99150, the worm and the gear portion are provided in the pedestal and the oscillation body. In these structures, the angular position adjustment did not have high precision due to looseness of an engagement portion exposed outside.

SUMMARY OF THE INVENTION

The present invention has been achieved to solve the problem for making the micro angle adjustments at high precision, and provides an angle adjusting device including: a pedestal having first and second setting planes crossing each other; a guide member fixed to the pedestal and including a track forming portion, an arcuate track formed on the track forming portion and base portion having first and second reference planes; an oscillation body moved along the track of the guide member; and a moving member for moving the oscillation body to adjust the angular position of the oscillation body around an oscillation axis passing through a center of radius of curvature of the track, wherein the track forming portion and the base portion are formed integrally, and the guide member is fixed to the pedestal in a state where the first and second reference planes are in contact with the first and second setting planes of the pedestal.

With the above constitution, the guide member is fixed to the pedestal such that the first and second flat reference planes of the base portion of the guide member are aligned with the first and second flat setting planes of the pedestal, in which the arcuate track is not distorted and the lower roundness of the track is avoided. Therefore, the angle adjustment of the oscillation body is made at high precision.

Preferably, the guide member is fixed to the pedestal so that the first reference plane is pressed against the first setting plane by a first screw penetrating through the first setting plane and the first reference plane, and fixed to the pedestal so that the second reference plane is pressed against the second setting plane by a second screw penetrating through the second setting plane and the second reference plane. Thereby, the positioning of the guide member is made more reliably.

Preferably, the pedestal has a pair of setting portions separated in a direction parallel to the oscillation axis, each setting portion being formed with the first and second setting planes, the guide member includes a pair of guide members that are fixed to the pair of setting portions to face each other, the track forming portion of each of the pair of guide members projects outward from the base portion, the oscillation body is disposed to stride across the pair of guide members, each track forming portion is formed with a pair of tracks having a different curvature, the pair of tracks being separated in a direction orthogonal to the direction along which the pair of guide members face each other, and at least a part of the moving member is received in a space defined by the pedestal, the oscillation body and the pair of guide members.

Thereby, the moving member does not occupy a large space, and the device is reduced in size. And the oscillator is guided stably by a total of four tracks.

Preferably, the track has a rolling contact face for rolling elements, the oscillation body is formed with an endless circulation passage containing a rolling contact face for rolling elements that is facing the rolling contact face of the track, a number of rolling elements circulating along with the movement of the oscillation body are arranged in the endless circulation passage, and the rolling elements are disposed in a preloaded state between the rolling contact face of rolling element for the track and the rolling contact faces. Thereby, the oscillation body has the increased rigidity against the guide member. The rigidity as herein used is a coefficient indicating the elasticity of displacement or deformation when a force or moment load is exerted on a component or between the components, and given as a static rigidity and a dynamic rigidity.

To solve the above-mentioned problem, another aspect of the invention provides an angle adjusting device including: a pedestal; a guide member fixed to the pedestal and including an arcuate track; an oscillation body moved along the track of the guide member; and a moving member for moving the oscillation body to adjust the angular position of the oscillation body around an oscillation axis passing through a center of radius of curvature of the track, wherein the moving member includes: a drive portion having an output shaft extending in a direction orthogonal to the oscillation axis and having an adjustable projection amount and provided in one of the pedestal and the oscillation body; a linkage shaft provided in the other of the pedestal and the oscillation body; and a linkage mechanism interposed between a top end portion of the output shaft and the linkage shaft to convert an axial movement of the output shaft into a movement of the oscillation body along the track, and the linkage mechanism includes a principal linkage member, which is linked to the top end portion of the output shaft rotatably around a rotation axis parallel to the oscillation axis, and linked to the linkage shaft to be linearly movable in an axial direction of the linkage shaft.

With the above constitution, the linkage mechanism has no engagement portion such as a screw, whereby it is possible to avoid a lower precision of angle adjustment caused by the looseness. Also, it has no need for a tension spring to resolve the looseness, and high durability.

Preferably, the principal linkage member is linked via a ball spline to the linkage shaft in the manner to be linearly movable. Thereby, the principal linkage member is stably moved along the linkage shaft.

When the output shaft is advanced or retreated with rotation, the linkage mechanism includes an auxiliary linkage member interposed between the top end portion of the output shaft and the principal linkage member, the auxiliary linkage member being linked to the top end portion of the output shaft to be relatively rotatable around its axial core, and the principal linkage member and the auxiliary linkage member are linked rotatably around the rotation axis parallel to the oscillation axis.

Preferably, the guide member includes a pair of guide members that are provided on the pedestal separately in a direction parallel to the oscillation axis, the oscillation body is disposed to stride across the pair of guide members, and the top end portion of the output shaft, the linkage shaft and the linkage mechanism are disposed in a space defined by the pedestal, the oscillation body and the pair of guide members. Thereby, when the output shaft is advanced or retreated, the left and right portions of the oscillation body are moved synchronously, preventing the pinch from occurring in the left and right tracks.

Preferably, the angle adjusting device further includes an angle position detector, wherein the angle position detector has a scale recording member provided in one of the pedestal and the oscillation body, and a detector for detecting the scale of the scale recording member, the detector provided in the other of the pedestal and the oscillation body. Thereby, the relation between the sensed output and the angle position of the oscillation body is linear, and the angle position is directly detected, resulting in the angle position detection at high precision.

To solve the above-mentioned problem, a further embodiment of the invention provides an angle adjusting device including: a pedestal; a guide member fixed to the pedestal and including an arcuate track; an oscillation body moved along the track of the guide member; and a moving member for moving the oscillation body to adjust the angular position of the oscillation body around an oscillation axis passing through a center of radius of curvature of the track, wherein the moving member includes: a drive portion having an output shaft extending in a direction orthogonal to the oscillation axis and having an adjustable projection amount and provided in the pedestal; and a linkage mechanism interposed between a top end portion of the output shaft of the drive portion and the oscillation body to convert an axial movement of the output shaft into a movement of the oscillation body along the track, and the linkage mechanism includes a leaf spring, the degree of curvature of the leaf spring is changed when the oscillation body is moved along the track to vary a distance between a fixed position of the leaf spring to the oscillation body and an axial core of the output shaft.

With the above constitution, the linkage mechanism includes the leaf spring, and via the leaf spring, the axial movement of the output shaft is converted into the movement of the oscillation body along the track. Therefore, the linkage mechanism has no engagement portion such as a screw, whereby it is possible to avoid a lower precision of angle adjustment caused by the looseness. Also, using the leaf spring, the structure is simplified with the lower cost.

When the output shaft is advanced or retreated with rotation, the linkage mechanism further includes a linkage member, the linkage member being linked to the top end portion of the output shaft to be relatively rotatable around its axial core, with one end portion of the leaf spring being fixed to the linkage member.

Preferably, the guide member includes a pair of guide members that are provided on the pedestal separately in a direction parallel to the oscillation axis, the oscillation body is disposed to stride across the pair of guide members, and the top end portion of the output shaft and the linkage mechanism are disposed in a space defined by the pedestal, the oscillation body and the pair of guide members. Thereby, when the output shaft is advanced or retreated, the left and right portions of the oscillation body are moved synchronously, preventing the pinch from occuring in the left and right tracks.

DETAILED DESCRIPTION OF THE PREFFERD EMBODIMENTS

Figure 1:
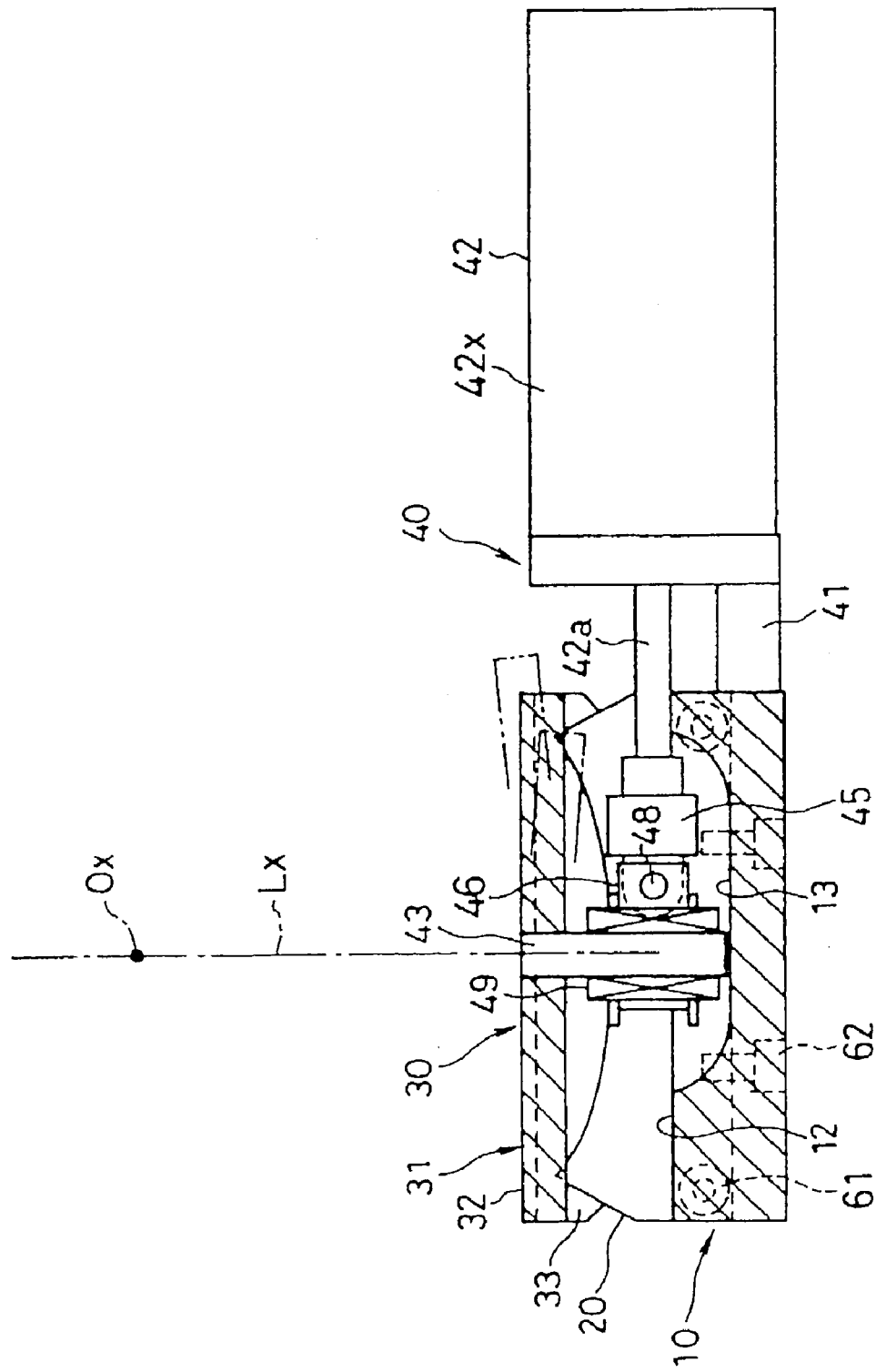
FIG. 1 is a longitudinal cross-sectional view of an angle adjusting device according to a first embodiment of the present invention.

Referring to FIGS. 1 to 9, an angle adjusting device according to a first embodiment of the present invention will be described below. The angle adjusting device comprises a pedestal 10, one pair of guide members 20 fixed to the pedestal 10, an oscillation body 30 guided along the guide members 20, a moving member 40 for moving the oscillation body 30, and a detector 50 for detecting the angular position of the oscillation body 30, as shown in FIGS. 1 to 4.

The oscillation body 30 is moved along a circular arc locus, as will be described later, in which an oscillation axis Ox is shown as the axis in the center of the circular arc locus in FIGS. 1 and 4. The oscillation axis Ox is orthogonal the paper face in FIG. 1, but extends from left to right in FIG. 4. Components will be described below in detail. The arrangements of the components are described with reference to the oscillation axis Ox.

The pedestal 10 has a base portion 11 of horizontal plate shape, and a protrusion 12 protruding from the upper face of the base portion 10. This protrusion 12 extends horizontally in a direction orthogonal to the oscillation axis Ox, and a concave portion 13 extending in a longitudinal direction of the protrusion 12 is formed on its upper face. Through holes 14 are formed at four corners of the base portion 11 to fix the device to a ground table (not shown) by screws (not shown) passing through the through holes 14. The term "pedestal" includes this ground table.

As shown in FIGS. 3 to 7, both side faces of the protrusion 12 of the pedestal 10 are provided as a pair of setting planes 15, 16 that are flat and vertical and make the action as will be described later. Also, the upper faces near the protrusion 12 in the base portion 11 of the pedestal 10 are provided as a pair of second setting planes 16 that are flat and horizontal. The first setting plane 15 and the second setting plane 16 cross each other perpendicularly. A normal line of the first setting plane 15 is parallel to the oscillation axis Ox and extends horizontally, and a normal line of the second setting plane 16 is perpendicular to the oscillation axis Ox and extends vertically. One pair of setting portions (near both sides of the protrusion 12) having the setting planes 15 and 16 are separated in the direction parallel to the oscillation axis Ox.

As shown in FIGS. 4 to 7, one pair of guide members 20 are fixed to one pair of setting portions respectively, separated in the direction parallel to the oscillation axis Ox and opposite to each other. Each guide member 20 has a base portion 21 and a track forming portion 22. The base portion 21 has one side face provided as a first reference plane 25 that is flat and vertical and a lower face provided as a second reference plane 26 that is flat and horizontal. The first reference plane 25 is made contact with the first setting plane 15 of the pedestal 10, and the second reference plane 26 is made contact with the second setting plane 16 of the pedestal 10, so that the guide members 20 are positioned. In this state, the guide members 20 are fixed to the pedestal 10.

In more detail, the guide member 20 has a horizontal through hole 25a with one end opened to the first reference plane 25. The pedestal 10 has a tapped hole 15a with one end opened to the setting plane 15. By inserting a screw 61 (first screw) through this through hole 25a from the outside, and screwing it into the tapped hole 15a, the guide member 20 is secured in such a manner that the first reference plane 25 is pressed against the first setting plane 15. Also, the pedestal 10 has a vertical through hole 16a with one end opened to the second setting plane 16, and the guide member 20 has a tapped hole 26a with one end opened to the second reference plane 26. By inserting a screw 62 (second screw) through this through hole 16a from the underside, and screwing it into the tapped hole 26a, the guide member 20 is secured in such a manner that the second reference plane 26 is pressed against the second setting plane 16. Each guide member 20 is secured by two (plural) screws 61 and two screws 62.

The track forming portion 22 of the guide member 20 has a circular arc shape, projecting from an upper end portion of the base portion 21 toward outside (on the opposite side of the protrusion 12 of the pedestal 10, and the opposite side of the face to face side of the guide members 20). The tracks 23a and 23b composed of a groove like a circular arc are formed on the upper and lower faces of this track forming portion 22. The groove faces of the tracks 23a and 23b constitute a rolling contact surface of rolling elements. These one pair of tracks 23a and 23b have different radii of curvature, but have the same center of the radius of curvature. These one pair of tracks 23a and 23b are separated in a direction orthogonal to the direction along which the pair of guide members 20 face each other.

As shown in FIGS. 1, 2 and 4 to 6, the oscillation body 30 has an oscillation table 31 and a transit block (transit body) 35. The oscillation table 31 has an upper wall 32 that is square in plane, and a pair of sidewalls 33 extending vertically from both side edges of the upper wall 32 downwards. A normal line in the center of the upper face of this upper wall 32 is indicated by Lx in FIG. 1. This normal line Lx intersects the oscillation axis Ox. Two transit blocks 35 are secured by bolts to the inner side face of each side wall 33. Each transit block 35 has the upper and lower endless circulation passages 36 (including a rolling contact surface for rolling elements, facing the tracks 23a and 23b of the guide members 20).

A number of balls 37 (rolling elements) are arranged in the endless circulation passage 36, which are circulated through the endless circulation passage 36 along with the movement of the transit block 35, and rolled on the rolling contact surfaces between the guide member 20 and the transit block 35. The diameter of balls 37 is slightly larger than a clearance between the rolling contact surfaces. The rolling contact surfaces and the balls 37 are resiliently deformed by entering the balls into the rolling contact surfaces, and thereby the balls 37 are preloaded.

Figure 3:
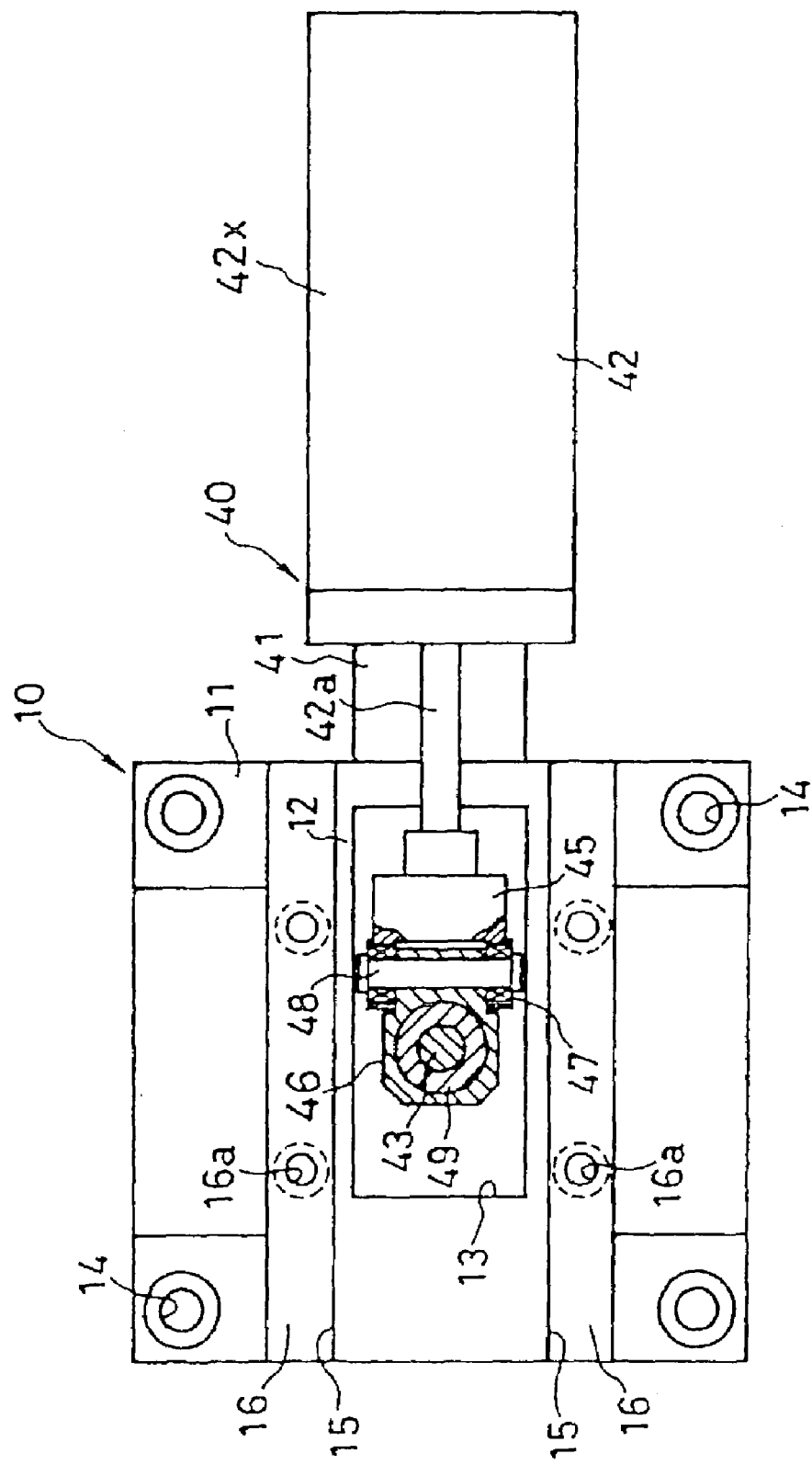
FIG. 3 is a plane view of the angle adjusting device, illustrating a pedestal and moving means partially in cross section.

The moving member 40 will be described below. The moving member 40 comprises a driving unit 42 (driving portion) fixed via a bracket 41 to the pedestal 10, as shown in FIGS. 1 and 3. An output shaft 42a of the driving unit 42 extends horizontally in a direction orthogonal to the oscillation axis Ox, its top end portion entering into a space defined by the pedestal 10, the oscillation table 31 and one pair of guide members 20. In this embodiment, a base end portion of the output shaft 42a is a ball screw, which is mated with a nut (not shown) within a casing 42x of the driving unit 42. A pulse motor (not shown) contained within the casing 42x of the driving unit 42 is driven to rotate the nut, so that the output shaft 42a is advanced or retreated whereby its projecting amount is adjusted.

Further, the moving member 40 comprises a linkage shaft 43 provided in the oscillation body 30. This linkage shaft 43 is fixed in the center of the oscillation table 31, orthogonal to the upper wall 32 of the oscillation table 31, and extends downwards. This linkage shaft 43 is received within a space defined by the pedestal 10, the oscillation table 31 and one pair of guide members 20, its top end portion entering into the concave portion 13 of the pedestal 10.

As shown in FIGS. 1 and 3, a linkage mechanism 45 is interposed between the output shaft 42a of the driving unit 42 and the linkage shaft 43. This linkage mechanism 45 has two linkage members 45 and 46. The base end portion of the linkage member 45 is fixed to the top end portion of the output shaft 42a.

The linkage member 45 has one pair of plate-like pieces at a top end portion thereof, in which a rotation shaft 48 is rotatably supported via a bearing 47. The linkage member (principal linkage member) 46 has a through hole 45x, in which the rotation shaft 48 is inserted and secured. Consequently, the linkage member 46 is linked to the top end portion of the output shaft 2a rotatably around the rotation shaft 48 (rotation axis parallel to the oscillation axis Ox). Moreover, the linkage member 46 is linked to the linkage shaft 43 movably in an axial direction of the linkage shaft 43 via a cylindrical ball spline 49 enclosing the linkage shaft 43.

When the pulse motor of the driving unit 42 is driven, the output shaft 42a is moved axially to alter its projecting amount. Since the linkage member 46 is linked via the linkage member 45 to the output shaft 42a to be capable of relative rotation but incapable of relative axial movement, it is moved in the same direction to press the linkage shaft 43 along with the axial movement of the output shaft 42a. As a result, the linkage shaft 43 is inclined. The transit block 35 moves along the tracks 23a and 23b of the guide members 20 in accordance with inclination of this linkage shaft 43, so that the oscillation table 31 is inclined to alter the angular position around the oscillation axis Ox. The linkage member 46 is rotatable with respect to the output shaft 42a, and axially movable with respect to the linkage shaft 43, whereby the inclination of the linkage shaft 43 along with the axial movement of the output shaft 42a is allowed.

The transit block 35 is guided in the track 23 with the rolling and circulating balls 37 and moved while drawing a circular arc locus, and the oscillation table 31 is inclined while drawing the circular arc locus. The center of this circular arc locus is defined as the oscillation axis Ox.

Figure 2:
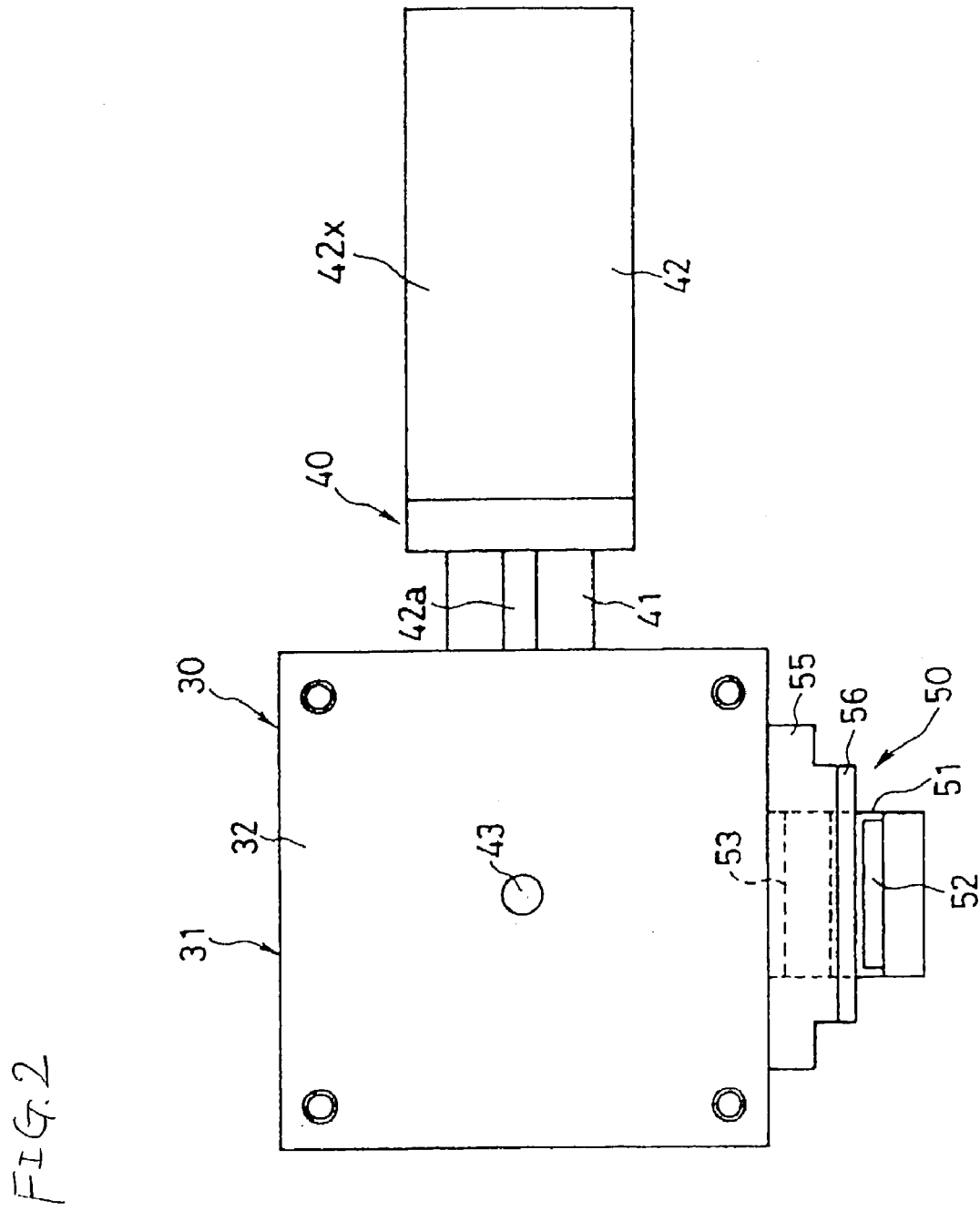
FIG. 2 is a plane view of the angle adjusting device.
Figure 4:
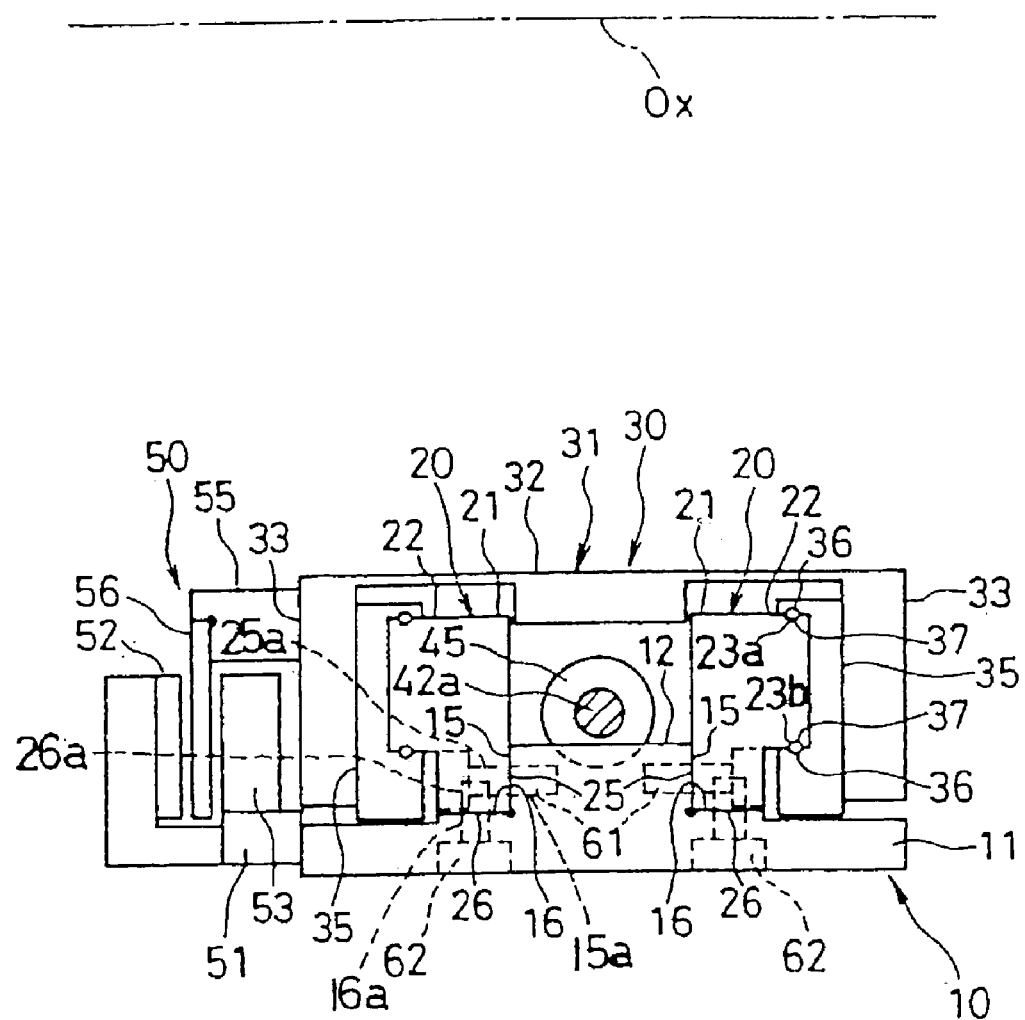
FIG. 4 is a view of the angle adjusting device as seen from the right.
Figure 5:
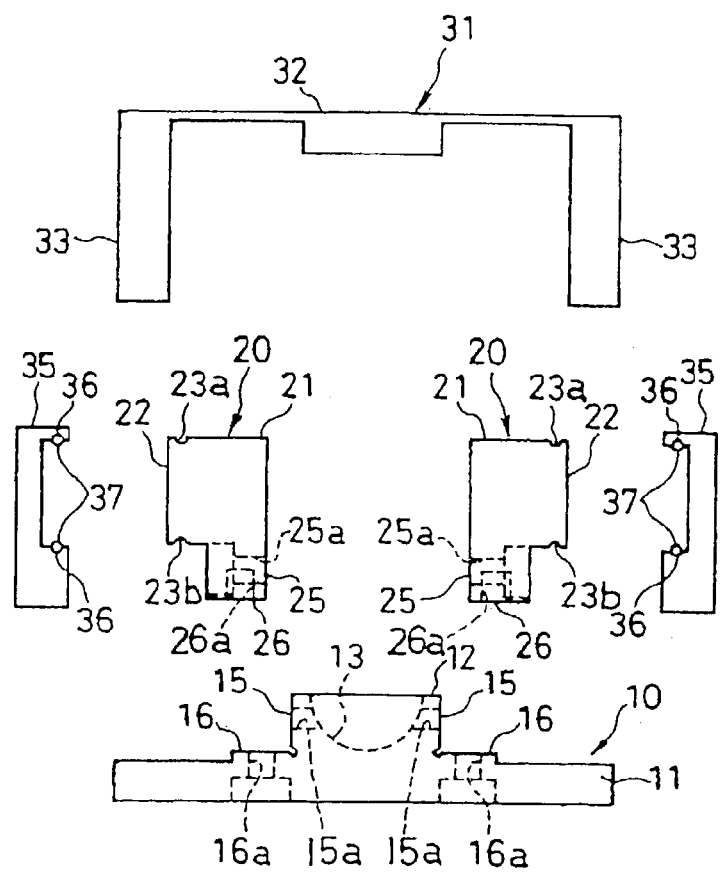
FIG. 5 is a view of the angle adjusting device as seen from the right, in which the pedestal, a guide member, a transit block and a oscillation table of the device are exploded.
Figure 6:
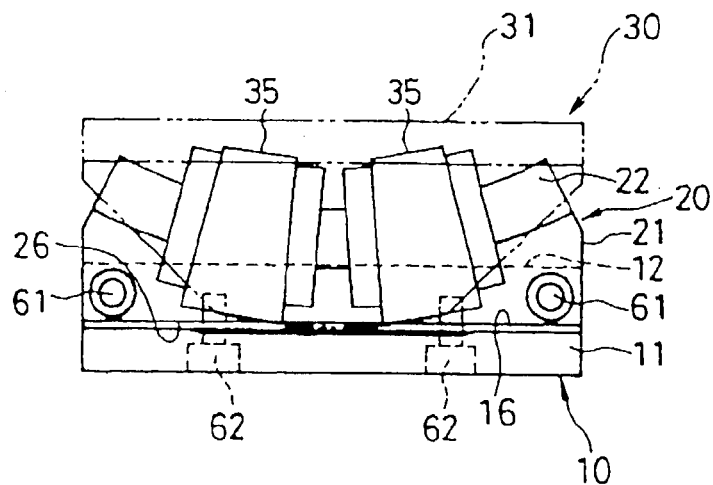
FIG. 6 is a side view of the angle adjusting device, in which the pedestal, the guide member and the transit block are assembled.
Figure 7:
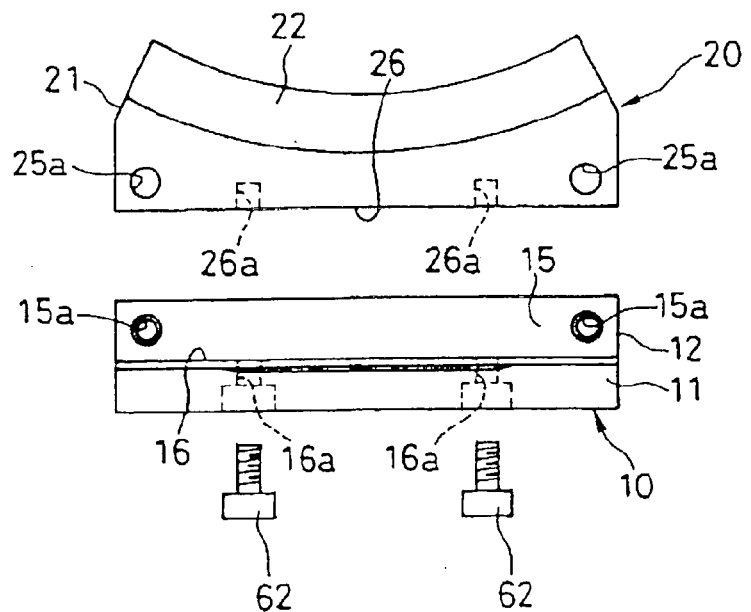
FIG. 7 is a side view illustrating the pedestal and the guide member that are exploded.
Figure 8:
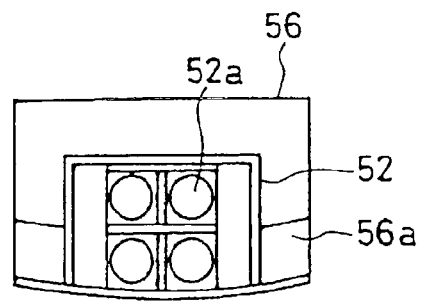
FIG. 8 is a side view partially illustrating angular position detecting means for the angle adjusting device.
Figure 9:
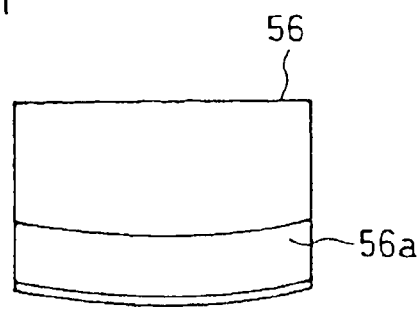
FIG. 9 is a side view showing a glass plate of the angle position detecting means.

As shown in FIGS. 2 and 4, angular position detector 50 for detecting the angular position of the oscillation table 31 has a light emitting unit 52 and a light receiving unit 53 (scale detecting member) provided via a bracket 51 on the pedestal 10, and a glass plate 56 (scale recording member) provided via a bracket 55 on the side wall 33 of the oscillation table 31. The light emitting unit 52 and the light receiving unit 53 are separated in the direction parallel to the oscillation axis Ox. As shown in FIG. 8, the light emitting unit 52 is divided into four light emitting portions 52a, namely upper, lower, left and right portions, and correspondingly, the light receiving unit 53 is also divided into four light receiving portions (not shown), namely, upper, lower, left and right portions.

The glass plate 56 has a scale portion 56a of circular arc shape disposed between the light emitting unit 52 and the light receiving unit 53. This scale portion 56a has a scale lattice. A detection signal is output from the light receiving unit 53 for every micro angular unit (scale) with the change of angular position of the oscillation table 31. Its principle is well known, and the detailed description is omitted. This angular position detecting signal is fed back to a microcomputer (not shown), which controls a pulse motor of the driving unit 42, on the basis of this detection signal, to make the angular adjustment of the oscillation table 31.

In the device of the above constitution, the first reference flat plane 25 in the base portion 21 of the guide member 20 is aligned with the flat first setting plane 15 of the pedestal 10, and the guide member 20 is fixed to the first setting plane 15 by the first screws 61 under pressure, and the second reference flat plane 26 is aligned with the second setting plane 16, and the guide member 20 is fixed to the second setting plane 16 by the second screws 62 under pressure. Therefore, the tracks 23a and 23b of circular arc shape are not distorted, whereby it is possible to avoid degradation in the roundness of the track 23 and make the angle adjustment of the oscillation body 30 at high precision.

For the moving member 40, the driving unit 42, commercially available, may be employed in which the motor and the ball screw mechanism are built in within the casing 42x. Therefore, there is no need for forming the threaded portion in the pedestal 10 and the oscillation body 30, whereby it is possible to avoid degrading the angle adjustment precision due to looseness.

Since the top end portion of the output shaft 42a of the moving member 40, the linkage shaft 43 and the linkage mechanism 45 are received in a space defined by the pedestal 10, one pair of guide members 20 and the oscillation body 30, there is no need for taking a large arrangement space for the moving member 40, whereby the device is reduced in size. When the output shaft 42a located in the middle is advanced or retreated, the left and right portions of the oscillation body 30 are moved synchronously, while being guided in the left and right tracks 23a and 23b, whereby the left and right tracks 23a and 23b are prevented from being pinched. Moreover, the oscillation body 30 is guided stably by four tracks as a whole. Since the balls 37 are preloaded, the rigidity of the oscillation body 30 to the guide members 20 is increased.

Also, the angular position detection of the oscillation body 30 is made using the light receiving unit 53 provided on the pedestal 10 with a scale of the glass plate 56 provided on the oscillation body 30, whereby the relation between the detected output and the angular position of the oscillation body 30 can be linear, and the angular position can be directly detected (i.e., the angular position is not indirectly calculated from the number of output pulses of the pulse motor for the driving unit 42), so that the angular position is detected at high precision. And the zero point adjustment is possible.

Figure 10A:
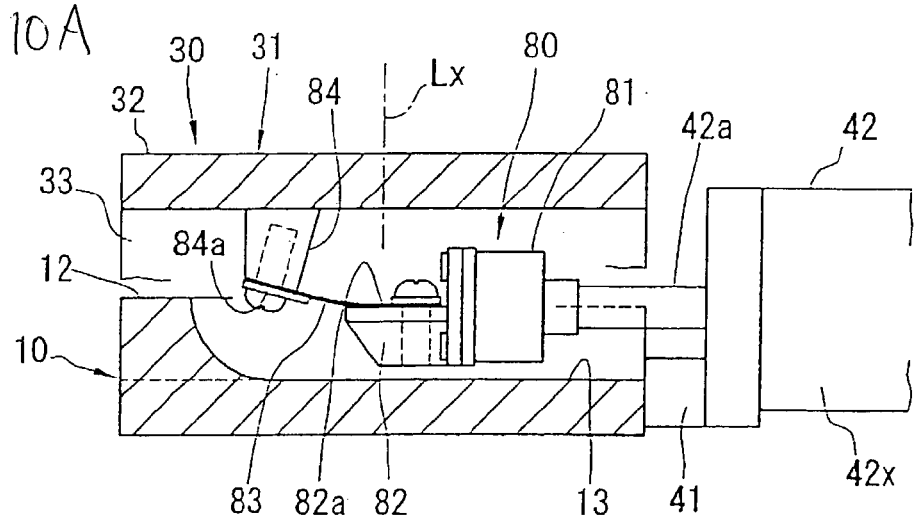
FIGS. 10A to 10C are longitudinal cross-sectional views partially illustrating an angle adjusting device according to a second embodiment of the invention, with different attitudes in FIGS. 10A to FIG. 10C.
Figure 10B:
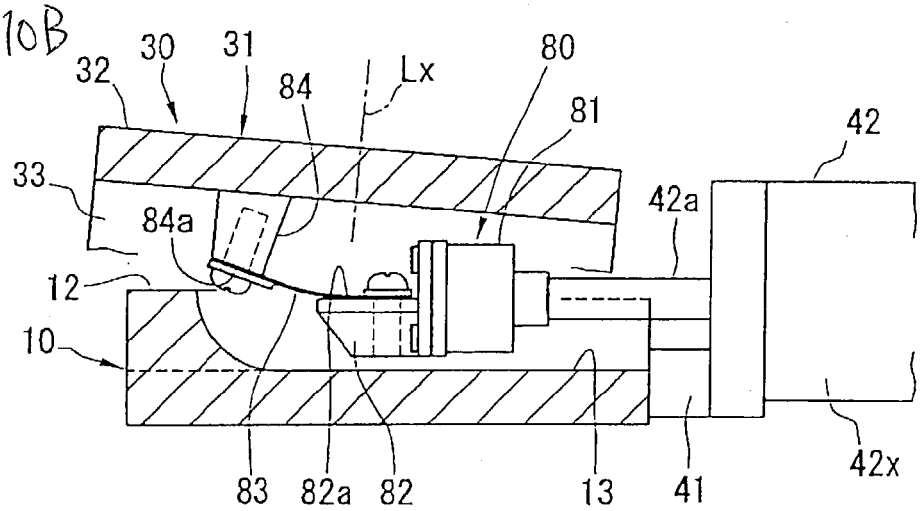
Figure 10C:
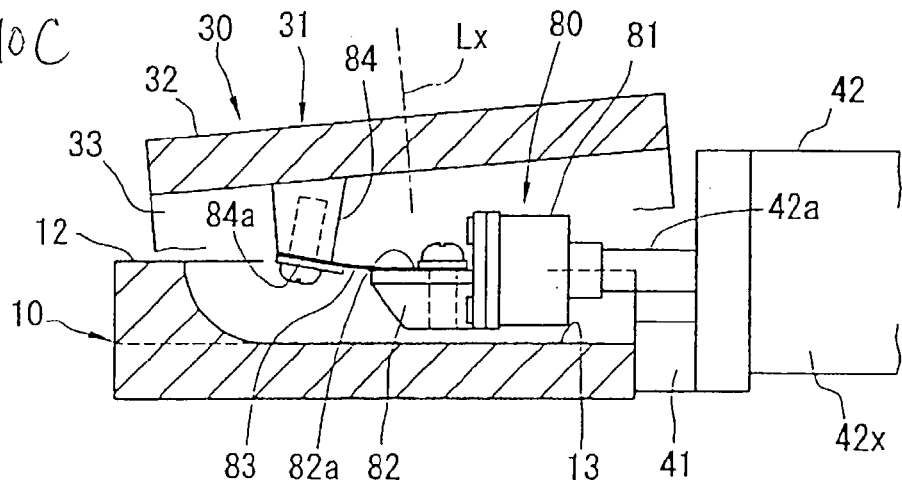
Figure 11:
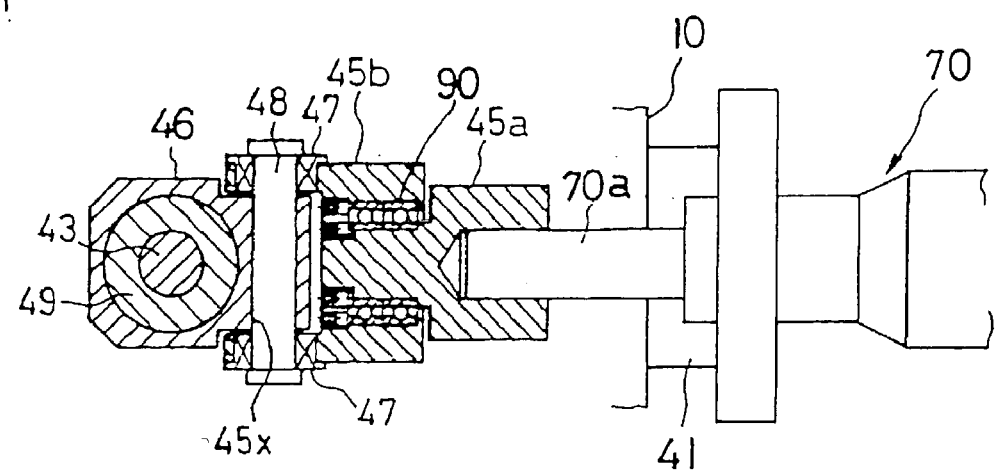
FIG. 11 is a longitudinal cross-sectional view partially illustrating an angle adjusting device according to a third embodiment of the invention.
Figure 12:
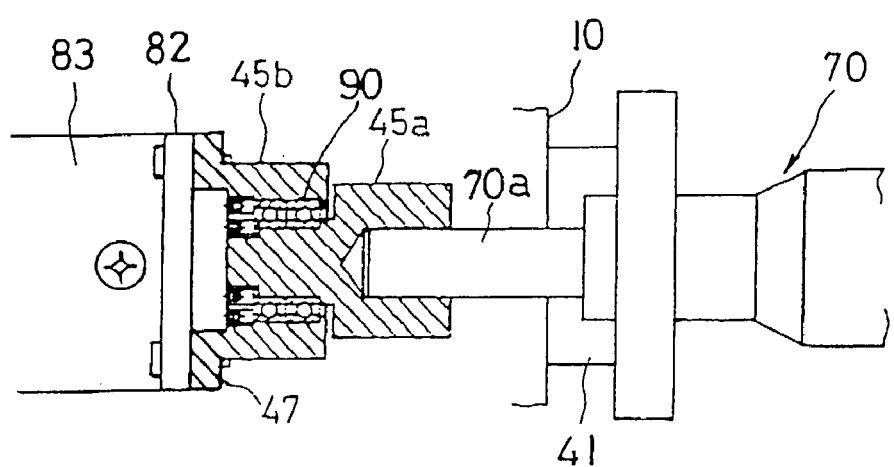
FIG. 12 is a longitudinal cross-sectional view partially illustrating an angle adjusting device according to a fourth embodiment of the invention.

Referring to FIGS. 10 to 12, other embodiments of the invention will be described below. These embodiments have the same basic constitution as the first embodiment, and different parts will be only described below. The corresponding parts are designated by the same numerals, and not described.

FIG. 10 shows a second embodiment of the invention. In this embodiment, the concave portion 13 formed in the protrusion 12 of the pedestal 10 leads to the side of the driving unit 42. A linkage mechanism 80 different from that of the first embodiment is interposed between the top end portion of the output shaft 42a of the driving unit 42 and the oscillation table 31.

The linkage mechanism 80 will be described below. A linkage member 81 is fixed at the top end portion of the output shaft 42a, and a bracket 82 is secured to this linkage member 81. An upper face of this bracket 82 is an attaching face 82a which is horizontal and parallel to the axial core of the output shaft 42a. On this attaching face 82a, one end of a wide leaf spring 83 extending in a longitudinal direction of the output shaft 42a is fixed. On the other hand, a convex portion 84 is formed on a lower face of the upper wall 32 of the oscillation table 31. A lower face of this convex portion 84 is an inclined attaching face 84a, to which the other end of the leaf spring 83 is fixed. One plate face of the leaf spring 83 faces the oscillation table 31 and the other plate face of the leaf spring 83 faces the pedestal 10.

The leaf spring 83 is curved in shape in a state (horizontal state) where the oscillation table 31 is parallel to the pedestal 10, as shown in FIG. 10A. When the output shaft 42a is axially moved by driving the pulse motor of the driving unit 42, the oscillation unit is moved along the tracks 23a,23b via the leaf spring 83. Since the leaf spring 83 is made of SUS steel plate and wide, it has a sufficient rigidity, whereby the conversion of the movement is enabled.

When the output shaft 42a is advanced to increase the projecting amount, as shown in FIG. 10B, the oscillation table 31 is moved to be inclined to the right, so that a fixing portion of the leaf spring 83 on the oscillation table 31 is displaced upward thereby a distance from an extension of the axial core of the output shaft 42a is increased. This upward displacement of the fixing portion of the leaf spring 83 is allowed due to an increase in the degree of curvature of the leaf spring 83.

When the output shaft 42a is retreated to decrease the projecting amount, as shown in FIG. 10C, the oscillation table 31 is moved to be inclined to the left, so that a fixing portion of the leaf spring 83 on the oscillation table 31 is displaced downward thereby a distance from an extension of the axial core of the output shaft 42a is decreased. This downward displacement of the fixing portion of the leaf spring 83 is allowed due to a decrease in the degree of curvature of the leaf spring 83. In this second embodiment, the leaf spring 83 is maintained in curved state within an angle adjustment range of the oscillation table 31. That is, the leaf spring 83 is curved slightly even when the projecting amount of the output shaft 42 is the smallest.

In the second embodiment, there is no need for forming the threaded portion in the pedestal 10 and the oscillation body 30, whereby it is possible to avoid degrading the angle adjustment precision due to looseness. Using the leaf spring 83, the bearing 47 and the ball spline 49 in the first embodiment can be omitted to produce a simple and cheap structure.

In a third embodiment of the invention as shown in FIG. 11, a microscrew 70 that is manually operated is employed as the driving portion. An output shaft 70a of the microscrew 70 has a linkage member 45a secured coaxially with the output shaft 70a. At the top end portion with smaller diameter of this linkage member 45a, a linkage member 45b (auxiliary linkage member) having a cylindrical base end portion is linked rotatably via a bearing 90. A rotation center of the linkage member 45b is coincident with an axial core of the output shaft 70a. The linkage members 45a and 45b are relatively immovable in the axial direction of the output shaft 70a. At the top end portion of the linkage member 45b, the linkage member 46 is linked via the bearing 47 and the rotation shaft 48, like the first embodiment.

Since the linkage member 45b is linked via the linkage member 45a to the output shaft 70a to be capable of relative rotation but incapable of relative axial movement, it is axially moved, following the axial movement of the output shaft 70a with rotation, to incline the oscillation table 31 via the linkage member 46 and the linkage shaft 43.

In a fourth embodiment as shown in FIG. 12, the leaf spring 83 used in the second embodiment and the microscrew 70 manually operated are employed. The top end portion of the output shaft 70a of the microscrew 70 is linked via the linkage members 45a and 45b and the bearing 90 to the bracket 82. Other constitution and action are the same as in the third embodiment.

It is preferable that the fixing portion of the leaf spring 83 to the shaft 70a is located almost on the extension of the axial core of the shaft 70a, or above it (closer to the oscillation table 31), like the second embodiment. In this manner, it suffices that the leaf spring 83 has a smaller amount of elastic deformation, and a smaller amount of elastic restoring force received by the driving portion.

This invention is not limited to the above embodiments, but various modifications or variations may be employed. For example, the output shaft may be a driving portion of a motor that is advanced or retreated with rotation, or may be a microscrew that is manually operated and advanced or retreated without rotation. Contrary to the above embodiments, the driving portion may be provided on the oscillation table, and the linkage shaft may be provided on the pedestal.

The angular position detector is not limited to the optical detector, but may be a magnetic detector.

This invention may be applied to the biaxial angle adjusting device. In this case, the upper stage and the lower stage are constituted in the same manner as the above embodiments, whereby the pedestal 10 in the upper stage is fixed on the oscillation table 31 in the lower stage. The oscillation table in the lower stage and the pedestal in the upper stage may be formed integrally.

As above described, with this invention, the micro angle position adjustment can be made at high precision.

What is claimed is:

1. An angle adjusting device comprising:
a pedestal having first and second setting planes crossing each other;
a guide member fixed to the pedestal and including a track forming portion, an arcuate track formed on the track forming portion and base portion having first and second reference planes;
an oscillation body moved along the track of the guide member; and
a moving member for moving the oscillation body to adjust the angular position of the oscillation body around an oscillation axis passing through a center of radius of curvature of the track, said oscillation body being substantially parallel to said oscillation axis,
wherein the track forming portion and the base portion are formed integrally, and
the guide member is fixed to the pedestal in a state where the first and second reference planes are in contact with the first and second setting planes of the pedestal,
wherein the guide member is fixed to the pedestal so that the first reference plane is pressed against the first setting plane by a first screw penetrating through the first setting plane and the first reference plane, and fixed to the pedestal so that the second reference plane is pressed against the second setting plane by a second screw penetrating through the second setting plane and the second reference plane.

2. An angle adjusting device comprising:
a pedestal having first and second setting planes crossing each other;
a guide member fixed to the pedestal and including a track forming portion, an arcuate track formed on the track forming portion and base portion having first and second reference planes;
an oscillation body moved along the track of the guide member; and
a moving member for moving the oscillation body to adjust the angular position of the oscillation body around an oscillation axis passing through a center of radius of curvature of the track, said oscillation body being substantially parallel to said oscillation axis,
wherein the track forming portion and the base portion are formed integrally, and
the guide member is fixed to the pedestal in a state where the first and second reference planes are in contact with the first and second setting planes of the pedestal,
wherein the pedestal has a pair of setting portions separated in a direction parallel to the oscillation axis, each setting portion being formed with the first and second setting planes,
the guide member comprises a pair of guide members that are fixed to the pair of setting portions to face each other,
the track forming portion of each of the pair of guide members projects outward from the base portion,
the oscillation body is disposed to stride across the pair of guide members,
each track forming portion is formed with a pair of tracks, each track of said pair having a different radius of curvature, the pair of tracks being separated in a direction orthogonal to the direction along which the pair of guide members face each other, and
at least a part of the moving member is received in a space defined by the pedestal, the oscillation body and the pair of guide members.

3. The angle adjusting device according to claim 2, wherein the track has a rolling contact face for rolling elements,
the oscillation body is formed with an endless circulation passage containing a rolling contact face for rolling elements that is facing the rolling contact face of the track,
a number of rolling elements circulating along with the movement of the oscillation body are arranged in the endless circulation passage, and
the rolling elements are disposed in a preloaded state between the rolling contact face of rolling element for the track and the rolling contact faces.

4. An angle adjusting devices, comprising:
a pedestal having first and second setting planes crossing each other;
a guide member fixed to the pedestal and including a track forming portion, an arcuate track formed on the track forming portion, and a base portion having first and second reference planes, wherein the guide member is fixed to the pedestal in a state where the first and second reference planes are in contact with the first and second setting planes of the pedestal;
an oscillation body moved along the track of the guide member; and
a moving member for moving the oscillation body to adjust the angular position of the oscillation body around an oscillation axis passing through a center of radius of curvature of the track,
wherein the moving member comprises:
a drive portion having an output shaft extending in a direction orthogonal to the oscillation axis and having an adjustable projection amount and provided in the pedestal; and
a linkage mechanism interposed between a top end portion of the output shaft of the drive portion and the oscillation body to convert an axial movement of the output shaft into a movement of the oscillation body along the track, and
the linkage mechanism comprises a leaf spring, the degree of curvature of the leaf spring is changed when the oscillation body is moved along the track to vary a distance between a fixed position of the leaf spring to the oscillation body and an axial core of the output shaft.

* * * * *